US007496714B2

(12) United States Patent
Gill et al.

(10) Patent No.: US 7,496,714 B2
(45) Date of Patent: *Feb. 24, 2009

(54) METHOD AND SYSTEM FOR ADAPTIVE BACK-OFF AND ADVANCE FOR NON-VOLATILE STORAGE (NVS) OCCUPANCY LEVEL MANAGEMENT

(75) Inventors: Binny S. Gill, Auburn, MA (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/026,569

(22) Filed: Feb. 6, 2008

(65) Prior Publication Data

US 2008/0126708 A1    May 29, 2008

Related U.S. Application Data

(63) Continuation of application No. 11/407,797, filed on Apr. 20, 2006, now Pat. No. 7,395,377.

(51) Int. Cl.
*G06F 12/00*    (2006.01)
(52) U.S. Cl. .................. 711/143; 711/111; 711/113; 711/114; 711/118; 711/141
(58) Field of Classification Search .......... 711/111, 711/113, 114, 118, 141, 143
See application file for complete search history.

(56) References Cited

U.S. PATENT DOCUMENTS 5,257,352 A * 10/1993 Yamamoto et al. .......... 711/136

| 6,513,097 | B1 | 1/2003 | Beardsley et al. |
| 6,629,198 | B2 | 9/2003 | Howard et al. |
| 6,732,124 | B1 | 5/2004 | Koseki et al. |
| 6,738,865 | B1 | 5/2004 | Burton et al. |
| 6,775,738 | B2 * | 8/2004 | Ash et al. .................. 711/113 |
| 6,785,771 | B2 | 8/2004 | Ash et al. |

(Continued)

OTHER PUBLICATIONS

Thomasian, A., et al., "RAID5 Performance with Distributed Sparing," IEEE Transactions on Parallel and Distributed Systems, vol. 8, No. 6, Jun. 1997, pp. 640-657.

(Continued)

*Primary Examiner*—Jack A Lane
(74) *Attorney, Agent, or Firm*—Gibb & Rahman, LLC (57) ABSTRACT

A technique for determining when to destage write data from a fast, NVS of a computer system from an upper level to a lower level of storage in the computer system comprises adaptively varying a destage rate of the NVS according to a current storage occupancy of the NVS; maintaining a high threshold level for the NVS; maintaining a low threshold level that is set to be a predetermined fixed amount below the high threshold; setting the destage rate of the NVS to zero when the NVS occupancy is below the low threshold; setting the destage rate of the NVS to be maximum when the NVS occupancy is above the high threshold; linearly increasing the destage rate of the NVS from zero to maximum as the NVS occupancy goes from the low to the high threshold; and adaptively varying the high threshold in response to a dynamic computer storage workload.

14 Claims, 5 Drawing Sheets

U.S. PATENT DOCUMENTS

2002/0156972 A1 10/2002 McKnight et al.
2007/0220200 A1 9/2007 Gill et al.
2007/0220201 A1 9/2007 Gill et al.

OTHER PUBLICATIONS

Menon, J., et al., "The Architecture of a Fault-Tolerant Cached RAID Controller," IEEE 1993, pp. 76-86.

Rahm, E., "Performance Evaluation of Extended Storage Architectures for Transaction Processing," 1992 ACM SIGMOD-6/92/CA, pp. 308-317.

Varma, A., et al., "Destage Algorithms for Disk Arrays with Non-Volatile Caches," IEEE Trans. Computers, vol. 47, No. 2, 1998, pp. 228-235.

* cited by examiner

FIG. 1
Ramp Phase Response Time / Throughput Curve

METHOD AND SYSTEM FOR ADAPTIVE BACK-OFF AND ADVANCE FOR NON-VOLATILE STORAGE (NVS) OCCUPANCY LEVEL MANAGEMENT

CROSS-REFERENCE TO RELATED APPLICATIONS

This application is a continuation of U.S. application Ser. No. 11/407,797 filed Apr. 20, 2006, the complete disclosure of which, in its entirety, is herein incorporated by reference.

BACKGROUND

1. Technical Field

The embodiments herein generally relate to computer systems, and, more particularly, to cache management in computer systems.

2. Description of the Related Art

Moore's law indicates that computer processing speed grows at an astounding 60% yearly rate. In contrast, disks which are electro-mechanical devices have improved their access times at a comparatively meager annual rate of approximately 8%. Moreover, disk capacity grows approximately 100 times per decade, implying fewer available spindles for the same amount of storage. These trends generally dictate that a processor must wait for increasingly larger number of cycles for a disk read/write process to complete. A significant amount of performance research has focused on hiding this input/output (I/O) latency for disk bound applications.

Caching is a fundamental technique in hiding I/O latency and is widely used in storage controllers, file systems, and operating systems. The Storage Networking Industry Association (SNIA) defines a cache as "a high speed memory or storage device used to reduce the effective time required to read data from or write data to a lower speed memory or device." Hereinafter, cache techniques will be discussed in the context of a storage controller wherein fast, but relatively expensive, random access memory is used as a cache for slow, but relatively inexpensive, disks. A modern storage controller's cache typically contains volatile memory used as a read cache and a non-volatile memory used as a write cache.

Read cache management is a well studied discipline. There are a large number of cache replacement techniques in this context, see, for example, LRU, CLOCK, FBR, LRU-2, 2Q, LRFU, LIRS, MQ, ARC, and CAR. In contrast, write caching is a relatively less developed subject. More particularly, there remains a need for a new technique for write cache management in the context of a storage controller equipped with fast, non-volatile storage (NVS).

SUMMARY

In view of the foregoing, the embodiments herein provide a method of determining when to destage write data from a fast, NVS of a computer system from an upper level of storage to a lower level of storage in the computer system, and a program storage device readable by computer, tangibly embodying a program of instructions executable by the computer to perform the method, wherein the method comprises adaptively varying a destage rate of the NVS according to a current storage occupancy of the NVS. Preferably, the method further comprises maintaining a high threshold level for the NVS; maintaining a low threshold level that is set to be a predetermined fixed amount below the high threshold level; setting the destage rate of the NVS to be zero when the NVS occupancy is below the low threshold level; setting the destage rate of the NVS to be maximum when the NVS occupancy is above the high threshold level; linearly increasing the destage rate of the NVS from zero to maximum as the NVS occupancy goes from the low threshold level to the high threshold level; and adaptively varying the high threshold level in response to a dynamic computer storage workload.

Preferably, the adaptive varying of the high threshold level comprises maintaining a desired occupancy level for the NVS; maintaining a max occupancy observed variable for the NVS; initializing the high threshold level to be equal to a desired occupancy level, wherein the high threshold level is constrained to never exceed the desired occupancy level; if the NVS occupancy drops below a current high threshold level, and if the max occupancy observed variable is greater than the desired occupancy level, decrementing and backing-off the high threshold level by a positive difference between the max occupancy observed variable and the desired occupancy level; and resetting the max occupancy observed variable, wherein if any of a sufficient number of destages has occurred and a sufficient time has passed since a previous time that the max occupancy observed variable was reset; if the max occupancy observed variable is less than the desired occupancy level, the method may further comprise incrementing and advancing the high threshold level by the positive difference between the desired occupancy level and the max occupancy observed variable.

Preferably, the low threshold level comprises 10% of the size of the NVS below the high threshold level. Furthermore, the high threshold level is preferably never allowed to be less than 10% of the size of the NVS. Additionally, the desired occupancy level preferably comprises 90% of the size of the NVS.

Another embodiment provides a system of determining when to destage write data from a fast, NVS of a computer system from an upper level of storage to a lower level of storage in the computer system, wherein the system comprises a cache controller adapted to adaptively vary a destage rate of the NVS according to a current storage occupancy of the NVS, wherein the cache controller comprises a first processor adapted to maintain a high threshold level for the NVS; maintain a low threshold level that is set to be a predetermined fixed amount below the high threshold level; set the destage rate of the NVS to be zero when the NVS occupancy is below the low threshold level; set the destage rate of the NVS to be maximum when the NVS occupancy is above the high threshold level; linearly increase the destage rate of the NVS from zero to maximum as the NVS occupancy goes from the low threshold level to the high threshold level; and adaptively vary the high threshold level in response to a dynamic computer storage workload.

Preferably, the adaptive varying of the high threshold level occurs by maintaining a desired occupancy level for the NVS; maintaining a max occupancy observed variable for the NVS; initializing the high threshold level to be equal to a desired occupancy level, wherein the high threshold level is constrained to never exceed the desired occupancy level; if the NVS occupancy drops below a current high threshold level, and if the max occupancy observed variable is greater than the desired occupancy level, decrementing and backing-off the high threshold level by a positive difference between the max occupancy observed variable and the desired occupancy level; and resetting the max occupancy observed variable.

Preferably, if any of a sufficient number of destages has occurred and a sufficient time has passed since a previous time that the max occupancy observed variable was reset; if the max occupancy observed variable is less than the desired occupancy level, the system may further comprise a second processor adapted to increment and advance the high threshold level by the positive difference between the desired occupancy level and the max occupancy observed variable. Moreover, the low threshold level preferably comprises 10% of the size of the NVS below the high threshold level, and wherein the high threshold level is preferably never allowed to be less than 10% of the size of the NVS. Furthermore, the desired occupancy level may comprise 90% of the size of the NVS.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new technique for write cache management in the context of a storage controller equipped with fast, NVS. The embodiments herein achieve this by providing a technique for adaptive back-off and advance for NVS occupancy level management. Referring now to the drawings, and more particularly to FIGS. 1 through 4, where similar reference characters denote corresponding features consistently throughout the figures, there are shown preferred embodiments herein.

Historically, NVS was introduced to enable fast writes. Generally, in the absence of NVS, every data write must be synchronously written (destaged) to disk to ensure consistency, correctness, durability, and persistence. Non-volatility of caches enables fast writes wherein writes are stored safely in the cache, and destaged later in an asynchronous fashion thus hiding the write latency of the disk. To guarantee continued low latency for writes, the data in the NVS must typically be drained so as to ensure that there is always some empty space for incoming writes; otherwise, follow-on writes will become effectively synchronous, which may adversely impact the response time for writes. On the other hand, if the writes are drained too aggressively, then one generally cannot fully exploit the benefits of write caching since the average amount of NVS cache utilized will be typically low. Some techniques provide a linear threshold scheduling scheme that vary the rate of destages to disks based on the instantaneous occupancy of the write cache. Other more simple schemes include least-cost scheduling and scheduling using a high/low mark.

Another related issue is the size of a write burst that the write cache is designed to absorb while providing a low response time of fast writes. The rate at which the NVS contents can be destaged is generally limited by the characteristics of the underlying disks. However, the rate at which write requests can arrive at the storage controller generally depends on the capabilities of the client of the storage controller and the bandwidth between the storage controller and its one or more clients. Typically, the maximum rate at which writes can arrive at the storage controller is much higher than the rate at which the NVS contents can be destaged. Therefore, in the event of a write burst, wherein a large number of write requests arrive at the storage controller in quick succession, generally the only way to guarantee fast writes for all requests is to have a sufficiently ample portion of the NVS available before the onset of the write burst. This is typically performed by allowing the NVS to have an average sufficient space available to absorb the expected size of the write bursts.

At any time, the techniques provided by the embodiments herein dynamically vary the number of outstanding destages in accordance with how full the NVS actually is. When the number of outstanding destages is higher, the rate of destages from the NVS is higher. The embodiments herein maintain a low threshold level which is initially set to 80% of the NVS size, and a high threshold level which is initially set to 90% of the NVS size. These thresholds apply to the amount of the NVS that is occupied by the data stored in the NVS, or as it will be referred to hereinafter, the NVS occupancy. When the NVS occupancy is at or below the lower threshold then the embodiments herein stop the destages or in other words, set the number of outstanding destages to zero. When the NVS occupancy is at or higher than the high threshold then the embodiments herein destage at a predetermined maximum rate (full throttle) of destage by setting the number of outstanding destages to a predetermined number, MAXQUEUE. When the NVS occupancy is between the high threshold and the low threshold, the number of outstanding destages is linearly scaled from zero to MAXQUEUE. In a preferred variation of the technique, the embodiments herein detect whether the successive destages issued from the NVS are for consecutive addresses on the storage medium. Due to the characteristics of modern disks, it is beneficial to performance if destages of sequences are issued without pauses in between. Thus, if the NVS occupancy is below the low threshold level and one was destaging sequential data, one would not stop all destages, but destage at a slow and steady rate (for example, four outstanding destages). This ensures that sequences are not broken with pauses that would occur if the number of outstanding destages would toggle between zero and non-zero on the low threshold boundary. The fact that the minimum outstanding number of destages for sequences are kept to a small non-zero number, ensures that the embodiments herein are able to give the underlying disks the writes at a sufficiently fast rate so as to exploit the full sequential write throughput of the disks.

The embodiments herein preferably linearly vary the rate of destage from the low threshold level to the high threshold level in a manner similar to that described in Varma, A. et al., "Destage algorithms for disk arrays with nonvolatile caches," IEEE Trans. Computers, Vol. 47, No. 2, pp. 228-235, 1998, the complete disclosure of which, in its entirety, is herein incorporated by reference. The more full within this range the NVS gets, the faster the drain rate; in other words, the larger the number of outstanding concurrent writes.

Figure 1:
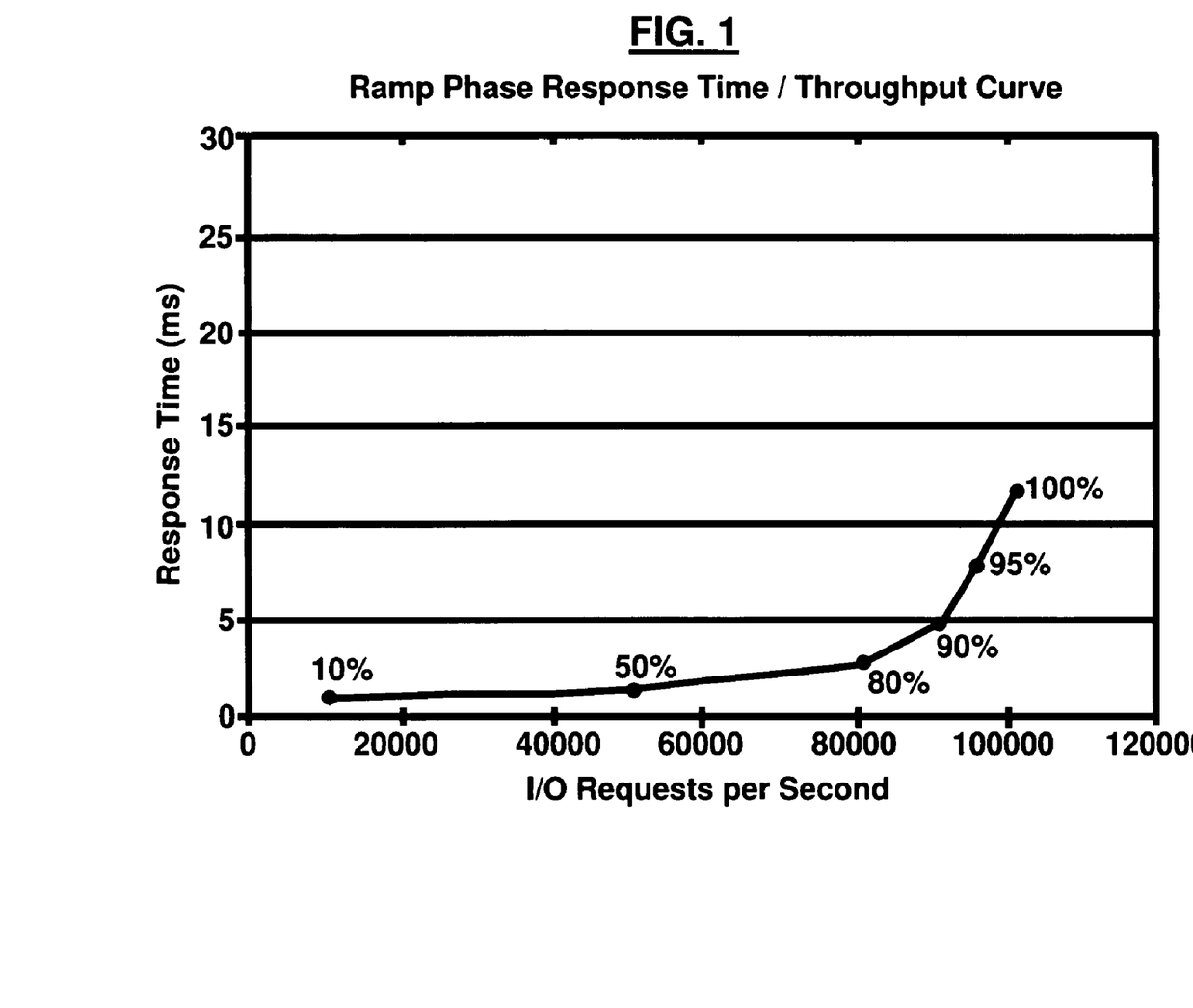
FIG. 1 is a graphical illustration of the convexity of the throughput versus the response time curve.

The methodology provided by the embodiments herein does not simply always destage using the maximum queue depth because of the following reason. Writing at full throttle regardless of the rate of new writes, is generally non-ideal for performance and reduces the maximum write throughput obtainable from the storage controller. What is desired is simply to keep up with the incoming write load (i.e., write requests) while keeping the NVS largely occupied without filling up the NVS. The higher the NVS occupancy the more effective the write cache is, as it can absorb more writes to the same logical addresses. In other words, the higher the NVS occupancy, the more it can exploit the temporal locality in the workload. Exploiting the temporal locality reduces the total number of destages necessary to the disks and thereby increases the maximum write throughput obtainable by the storage controller. Furthermore, the convexity of the throughput versus the response time curve indicates that a steady rate of destage is more effective than several destages at one time and very few at another as illustrated in FIG. 1. Dynamically ramping up the number of outstanding concurrent writes to reflect how full the NVS is helps to achieve this steady rate. Moreover, always using a full throttle destage rate may generally lead to an abrupt "start" and "stop" situation, respectively, when the lower destage threshold level is reached. This "start" and "stop" situation is contrary to a steady rate of destage and thus has a higher average response time per destage. This indirectly increases the average response time for the concurrent reads in the system.

Additionally, the embodiments herein dynamically adapt the high and low threshold levels. Instead of fixing the high and low threshold levels to 90% and 80% of the NVS size, they are dynamically changed according to the behavior of the workload. As noted earlier, the NVS preferably keeps a sufficient amount of space available to absorb write bursts. The ability to absorb write bursts is helpful for maintaining low write response times in a storage controller. The difficulty is that the size of the write bursts is solely dependent on the workloads and typically cannot be preset in the storage controller. Accordingly, the embodiments herein facilitates the ability to adapt the high threshold dynamically according to the workload, thus "learning the space" required to absorb write bursts as the workload progresses. Write response times are negligible as long as the NVS is sufficiently empty to accommodate incoming requests, and can become quite large if the NVS ever becomes full. The high threshold level is adapted to attempt to avoid this undesirable state while maximizing the NVS occupancy. To achieve this, the embodiments herein implement an adaptive back-off and advance scheme. The low threshold level is preferably always set to be equal to the high threshold level minus 10% of the NVS size. Thus, although the high threshold level can vary according to the workload, the low threshold is fixed relative to the high threshold level. The desired occupancy level is defined to be 90% of the NVS size and represents the level of NVS occupancy which would be good for performance. It is typically set to a fixed high percentage (for example, 90%). The high threshold level is preferably never allowed to be higher than the desired occupancy level or lower than 10% of the NVS size.

The embodiments herein adapt the high threshold level such that the NVS occupancy is kept close to the desired occupancy level. Whenever the NVS occupancy rises above the desired occupancy level, the embodiments herein indicates that the high threshold level is too high. This is used as an indication to bring down the high threshold level. The desired occupancy is not 100% of the NVS thereby allowing the storage controller to dynamically compute the high threshold level while trying to avoid filling up all of the NVS (which results in large increases in write response times). A variable called the max occupancy observed is maintained that records the maximum occupancy of the cache since the last time it was reset. Furthermore, if and when the NVS occupancy drops below the current high threshold level, the embodiments herein decrement the high threshold level by any positive difference between the max occupancy observed variable and the desired occupancy level and the embodiments herein reset the max occupancy observed variable to the current occupancy level thus initializing it for the next round of computation of the high threshold level. Decrementing the high threshold level hurts the average occupancy levels in the NVS and reduces spatial as well as temporal locality for writes, hurting performance. Thus, to counteract this decrementing force, if after a sufficient number of destages (for example, equal to the number of destages between two re-settings of the max occupancy observed variable) the max occupancy observed variable is lower than the desired occupancy level, then the embodiments herein increment the high threshold level by the difference between the desired occupancy level and the max occupancy observed variable, and then the embodiments herein reset the max occupancy observed variable to the current occupancy level.

Figure 2A:
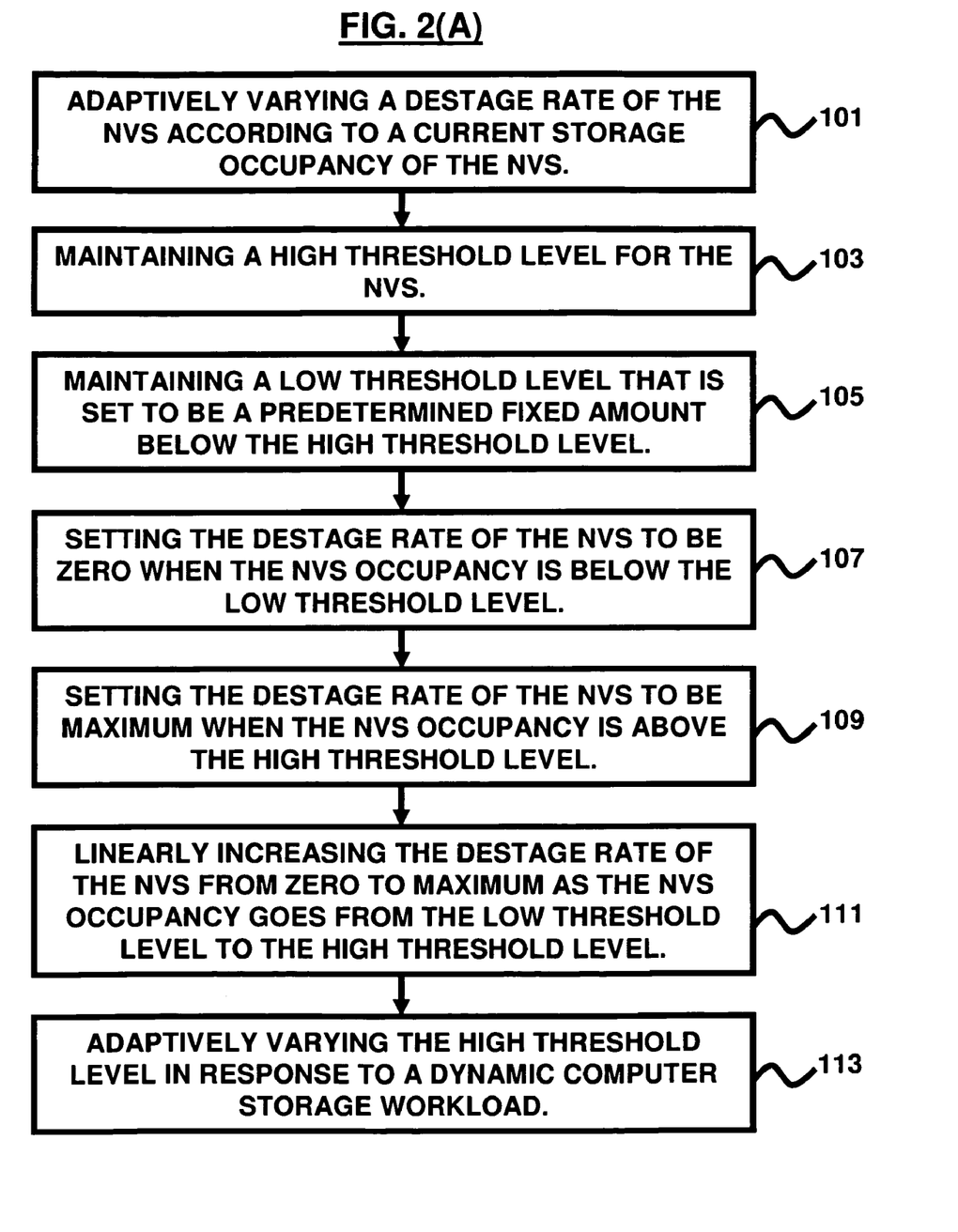
FIGS. 2(A) and 2(B) are flow diagrams illustrating preferred methods according to an embodiment herein.
Figure 2B:
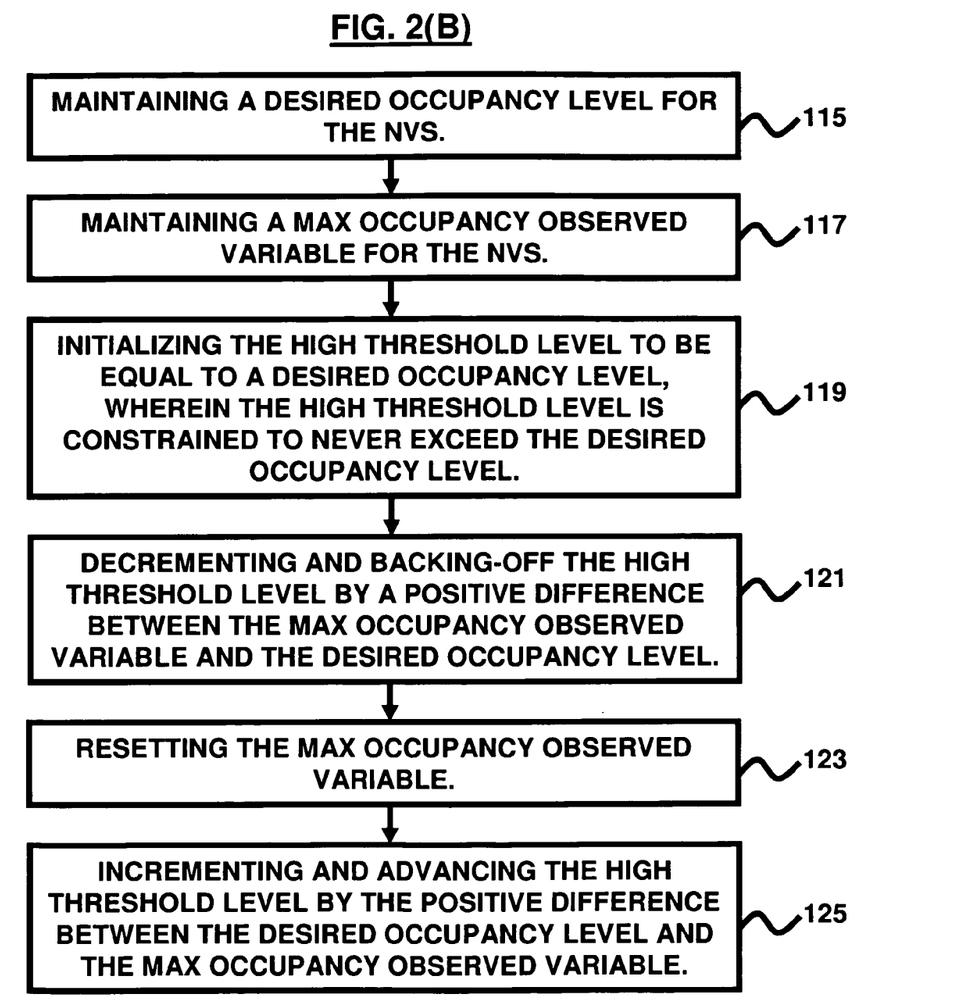

FIGS. 2(A) and 2(B) are flow diagrams illustrating a method of determining when to destage write data from a fast, NVS of a computer system from an upper level of storage to a lower level of storage in the computer system according to an embodiment herein. The upper level of storage comprises relatively faster and more expensive storage (such as a fast, NVS) than the lower level of storage which is relatively cheaper but slower (such as disk drives). The method comprises adaptively varying (101) a destage rate of the NVS according to a current storage occupancy of the NVS. Preferably, the method further comprises maintaining (103) a high threshold level for the NVS; maintaining (105) a low threshold level that is set to be a predetermined fixed amount below the high threshold level; setting (107) the destage rate of the NVS to be zero when the NVS occupancy is below the low threshold level; setting (109) the destage rate of the NVS to be maximum when the NVS occupancy is above the high threshold level; linearly increasing (111) the destage rate of the NVS from zero to maximum as the NVS occupancy goes from the low threshold level to the high threshold level; and adaptively varying (113) the high threshold level in response to a dynamic computer storage workload.

Preferably, the adaptive varying (113) of the high threshold level comprises maintaining (115) a desired occupancy level for the NVS; maintaining (117) a max occupancy observed variable for the NVS; initializing (119) the high threshold level to be equal to a desired occupancy level, wherein the high threshold level is constrained to never exceed the desired occupancy level; if the NVS occupancy drops below a current high threshold level, and if the max occupancy observed variable is greater than the desired occupancy level, decrementing and backing-off (121) the high threshold level by a positive difference between the max occupancy observed variable and the desired occupancy level; and resetting (123) the max occupancy observed variable, wherein if any of a sufficient number of destages has occurred and a sufficient time has passed since a previous time that the max occupancy observed variable was reset; if the max occupancy observed variable is less than the desired occupancy level, the method may further comprise incrementing and advancing (125) the high threshold level by the positive difference between the desired occupancy level and the max occupancy observed variable.

Preferably, the low threshold level comprises 10% of the size of the NVS below the high threshold level. Furthermore, the high threshold level is preferably never allowed to be less than 10% of the size of the NVS. Additionally, the desired occupancy level preferably comprises 90% of the size of the NVS.

The embodiments herein can take the form of an entirely hardware embodiment, an entirely software embodiment or an embodiment including both hardware and software elements. The software embodiment includes but is not limited to firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
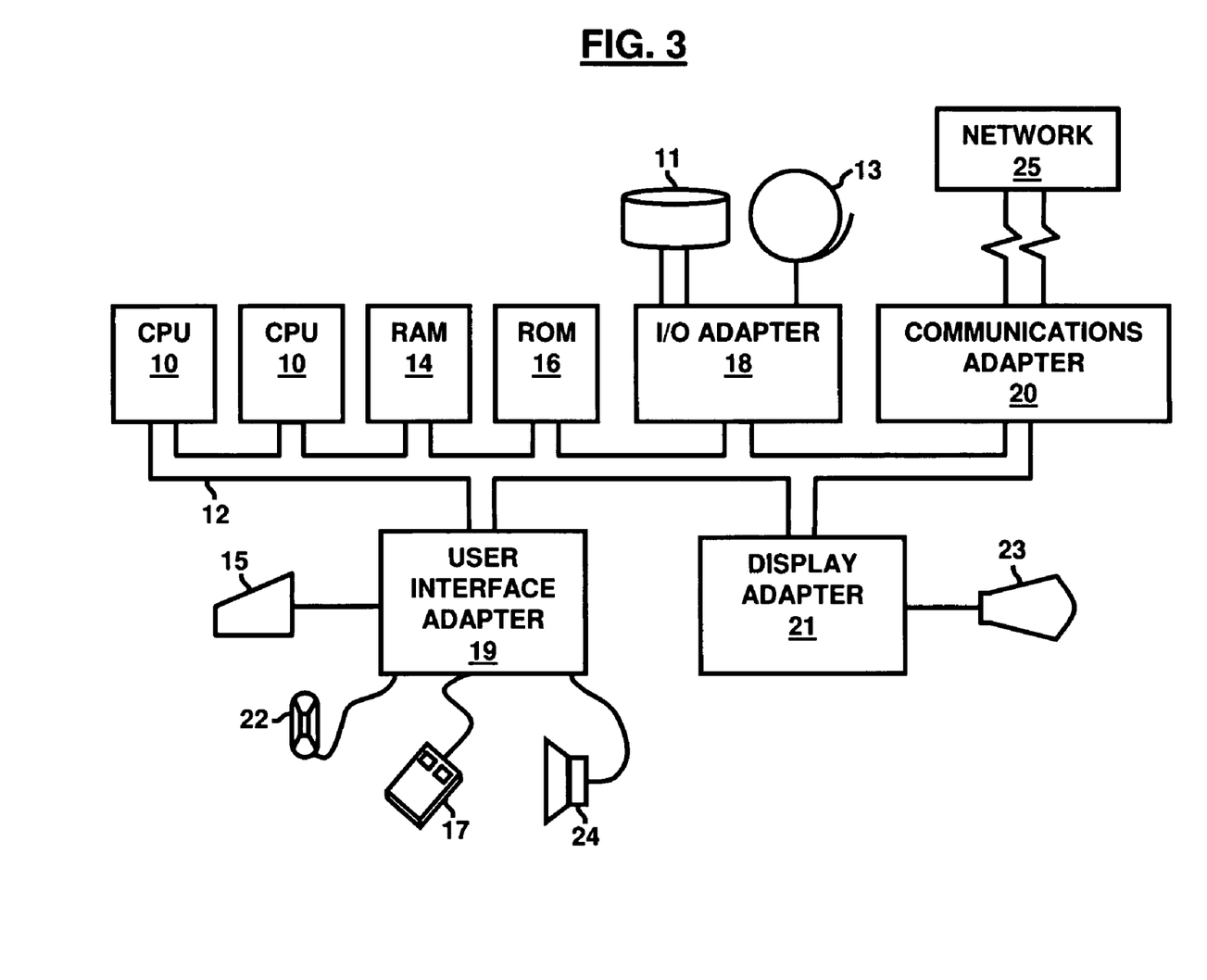
FIG. 3 illustrates a schematic diagram of a computer system according to an embodiment herein.

A representative hardware environment for practicing the embodiments herein is depicted in FIG. 3. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 4:
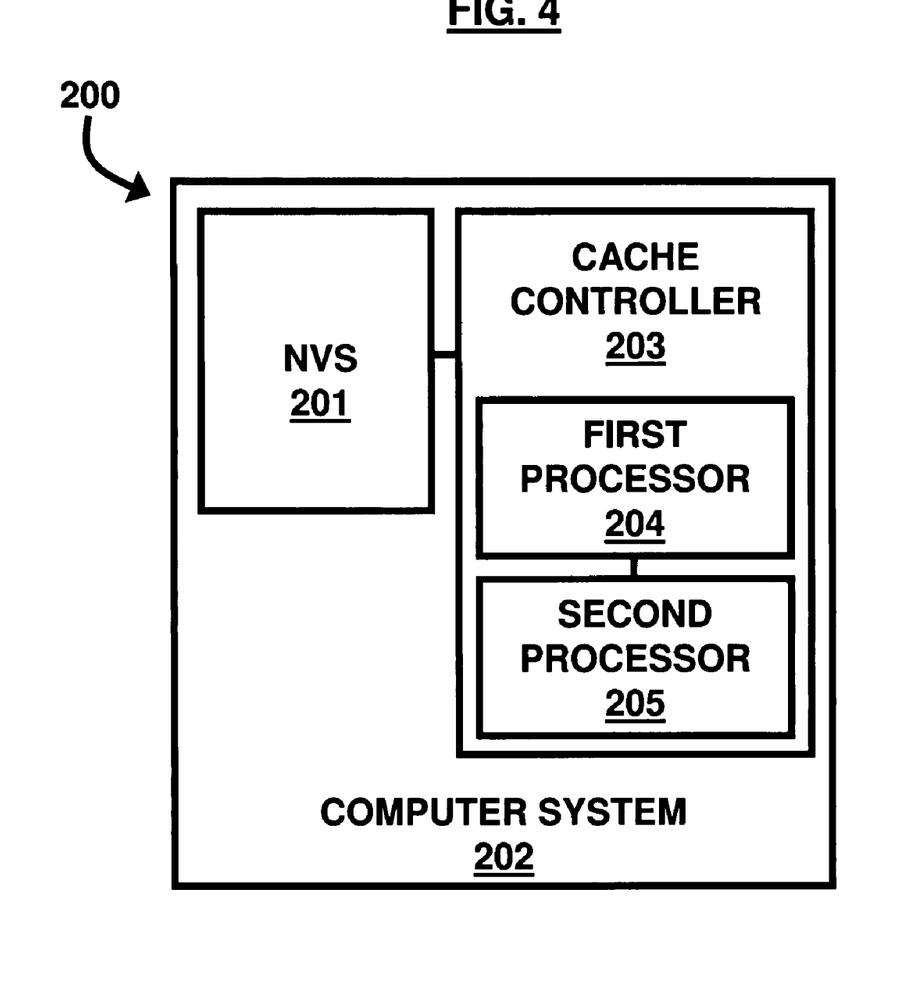
FIG. 4 illustrates a system diagram according to an embodiment herein.

FIG. 4 is a system block diagram illustrating a system 200 of determining when to destage write data from a fast, NVS 201 of a computer system 202 from an upper level of storage to a lower level of storage in the computer system 202, wherein the system 200 comprises a cache controller 203 adapted to adaptively vary a destage rate of the NVS 201 according to a current storage occupancy of the NVS 201, wherein the cache controller 203 comprises a first processor 204 adapted to maintain a high threshold level for the NVS 201; maintain a low threshold level that is set to be a predetermined fixed amount below the high threshold level; set the destage rate of the NVS 201 to be zero when the NVS occupancy is below the low threshold level; set the destage rate of the NVS 201 to be maximum when the NVS occupancy is above the high threshold level; linearly increase the destage rate of the NVS 201 from zero to maximum as the NVS occupancy goes from the low threshold level to the high threshold level; and adaptively vary the high threshold level in response to a dynamic computer storage workload.

Preferably, the adaptive varying of the high threshold level occurs by maintaining a desired occupancy level for the NVS 201; maintaining a max occupancy observed variable for the NVS 201; initializing the high threshold level to be equal to a desired occupancy level, wherein the high threshold level is constrained to never exceed the desired occupancy level; if the NVS occupancy drops below a current high threshold level, and if the max occupancy observed variable is greater than the desired occupancy level, decrementing and backing-off the high threshold level by a positive difference between the max occupancy observed variable and the desired occupancy level; and resetting the max occupancy observed variable.

Preferably, if any of a sufficient number of destages has occurred and a sufficient time has passed since a previous time that the max occupancy observed variable was reset; if the max occupancy observed variable is less than the desired occupancy level, the system 200 may further comprise a second processor 205 adapted to increment and advance the high threshold level by the positive difference between the desired occupancy level and the max occupancy observed variable. Moreover, the low threshold level preferably comprises 10% of the size of the NVS 201 below the high threshold level, and wherein the high threshold level is preferably never allowed to be less than 10% of the size of the NVS 201. Furthermore, the desired occupancy level may comprise 90% of the size of the NVS 201.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of determining when to destage write data from a fast, non-volatile storage (NVS) of a computer system from an upper level of storage to a lower level of storage in said computer system, said method comprising:
adaptively varying a destage rate of said NVS according to a current storage occupancy of said NVS; and
adaptively varying a high threshold level in response to a dynamic computer storage workload, in a process comprising:
maintaining a desired occupancy level for said NVS;
maintaining a maximum occupancy observed varied for said NVS;
initializing said high threshold level to be equal to desired occupancy level,
wherein said high threshold level is constrained to never exceed said desired occupancy level;
if said NVS occupancy drops below a current high threshold level, and if said maximum occupancy observed variable is greater than said desired occupancy level, decrementing and backing-off said high threshold level by a positive difference between said maximum occupancy observed variable and said desired occupancy level; and
resetting said maximum occupancy observed variable.

2. The method of claim 1, wherein if any of a sufficient number of destages has occurred and a sufficient time has passed since a previous time that said maximum occupancy observed variable was reset; and
if said maximum occupancy observed variable is less than said desired occupancy level, said method further comprising:
incrementing and advancing said high threshold level by said positive difference between said desired occupancy level and said maximum occupancy observed variable.

3. The method of claim 1, wherein said low threshold level comprises 10% of the size of said NVS below said high threshold level.

4. The method of claim 1, wherein said high threshold level is never allowed to be less than 10% of the size of said NVS.

5. The method of claim 1, wherein said desired occupancy level comprises 90% of the size of said NVS.

6. A program storage device readable by computer, tangibly embodying a program of instructions executable by said computer to perform a method of determining when to destage write data from a fast, non-volatile storage (NVS) of a computer system from an upper level of storage to a lower level of storage in said computer system, said method comprising:
adaptively varying a destage rate of said NVS according to a current storage occupancy of said NVS; and
adaptively varying a high threshold level in respond to a dynamic computer storage workload, in a process comprising:
maintaining a desired occupancy level for said NVS;
maintaining a maximum occupancy observed variable for said NVS;
initializing said high threshold level to be equal to a desired occupancy level,
wherein said high threshold level is constrained to never exceed said desired occupancy level;
if said NVS occupancy drops below a current high threshold level, and if said maximum occupancy observed variable is greater than said desired occupancy level, decrementing and backing-off said high threshold level by a positive difference between said maximum occupancy observed variable and said desired occupancy level; and
resetting said maximum occupancy observed variable.

7. The program storage device of claim 6, wherein if any of a sufficient number of destages has occurred and a sufficient time has passed since a previous time that said maximum occupancy observed variable was reset; if said maximum occupancy observed variable is less than said desired occupancy level, said method further comprising incrementing and advancing said high threshold level by said positive difference between said desired occupancy level and said maximum occupancy observed variable.

8. The program storage device of claim 6, wherein said low threshold level comprises 10% of the size of said NVS below said high threshold level.

9. The program storage device of claim 6, all the limitations of which are incorporated herein by reference, wherein said high threshold level is never allowed to be less than 10% of the size of said NVS.

10. The program storage device of claim 6, wherein said desired occupancy level comprises 90% of the size of said NVS.

11. A system of determining when to destage write data from a fast, non-volatile storage (NVS) of a computer system from an upper level of storage to a lower level of storage in said computer system, said system comprising:
a cache controller adapted to adaptively vary a destage rate of said NVS according to a current storage occupancy of said NVS; and
a first processor adapted to adaptively vary a high threshold level in response to a dynamic computer storage workload, wherein the adaptive varying of said high threshold level occurs by:
maintaining a desired occupancy level for said NVS;
maintaining a maximum occupancy observed variable for said NVS;
initializing said high threshold level to be equal to a desired occupancy level,
wherein said high threshold level is constrained to never exceed said desired occupancy level;
if said NVS occupancy drops below a current high threshold level, and if said maximum occupancy observed variable is greater than said desired occupancy level, decrementing and backing-off said high threshold level by a positive difference between said maximum occupancy observed variable and said desired occupancy level; and
resetting said maximum occupancy observed variable.

12. The system of claim 11, wherein if any of a sufficient number of destages has occurred and a sufficient time has passed since a previous time that said maximum occupancy observed variable was reset; if said maximum occupancy observed variable is less than said desired occupancy level, said system further comprising a second processor adapted to increment and advance said high threshold level by said positive difference between said desired occupancy level and said maximum occupancy observed variable.

13. The system of claim 11, wherein said low threshold level comprises 10% of the size of said NVS below said high threshold level, and wherein said high threshold level is never allowed to be less than 10% of the size of said NVS.

14. The system of claim 11, wherein said desired occupancy level comprises 90% of the size of said NVS.

* * * * *